United States Patent [19]

Minami et al.

[11] Patent Number: 4,763,968
[45] Date of Patent: Aug. 16, 1988

[54] SURGICAL MICROSCOPE

[75] Inventors: Kazuyuki Minami, Musashino; Takashi Nagano; Hiroshi Fujiwara, both of Hachiouji; Takashi Fukaya, Ina; Yutaka Takabayashi, Hachiouji; Takayoshi Togino, Tokyo, all of Japan

[73] Assignee: Olympus Optical Co., Ltd., Tokyo, Japan

[21] Appl. No.: 74,842

[22] Filed: Jul. 17, 1987

[30] Foreign Application Priority Data

Jul. 18, 1986 [JP] Japan .................... 61-169417

[51] Int. Cl.⁴ .................. G02B 21/22; G02B 27/26
[52] U.S. Cl. .................... 350/516; 350/517; 350/524
[58] Field of Search ............ 350/507, 510, 516, 517, 350/523, 524, 527

[56] References Cited

U.S. PATENT DOCUMENTS

| 3,418,034 | 12/1968 | Ambrose | 350/517 |
| 4,341,435 | 7/1982 | Lang et al. | 350/523 |
| 4,448,498 | 5/1984 | Muller et al. | 350/516 |
| 4,449,795 | 5/1984 | Yamada | 350/516 |
| 4,561,731 | 12/1985 | Kley | 350/516 |
| 4,657,356 | 4/1987 | Matsumura | 350/516 |
| 4,674,845 | 6/1987 | Matsumura | 350/516 |

FOREIGN PATENT DOCUMENTS

| 3006373 | 9/1980 | Fed. Rep. of Germany | 350/516 |
| 3602095 | 7/1986 | Fed. Rep. of Germany | 350/516 |
| 55-10174 | 3/1980 | Japan . | |
| 55-39364 | 3/1980 | Japan . | |
| 55-113014 | 9/1980 | Japan | 350/516 |

Primary Examiner—John K. Corbin
Assistant Examiner—Martin Lerner
Attorney, Agent, or Firm—Cushman, Darby & Cushman

[57] ABSTRACT

In order to allow the assistant also to make an observation of the same region of the object as by the surgical operator in the form of a normal and clear stereoscopic image, and to enable the size of the barrel as well as the price to be about the same as that of an ordinary surgical microscope having two optical axes, the surgical microscope of the invention is arranged so that by the employment of two pairs of prisms each having a polarized light beam splitter section and a total reflection surface, a pair of operator's observational optical systems and a pair of assistant's observational optical systems are used partly in common, and one of the polarized beams so split by the polarized beam splitter section is utilized as the operator's observational light, and the other is utilized as the assistant's observational light. One pair among the two pairs of prisms is constructed as a first stereoscopic view adapter, and the other pair as a second stereoscopic view adapter, and the common portion of the observational optical systems mentioned above is constructed in the form of a barrel, and all of these constituent parts are removably coupled to each other.

15 Claims, 8 Drawing Sheets

SURGICAL MICROSCOPE

BACKGROUND OF THE INVENTION (a) Field of the Invention

The present invention relates to an optical microscope, and more particularly it pertains to a surgical microscope.

(b) Description of the Prior Art

In surgical operations conducted by utilizing a surgical microscope, there is the necessity for the surgical operator's assistant who, standing by the side of the operator, assists the latter, to constantly observe the same region of the patient's body as that observed by the operator. As the known means for materializing this kind of demand, there may be enumerated, for example, a device of the type (I) as shown in Japanese Patent Publication No. Sho 55-10174 and a device of the type (II) as shown in Japanese Utility Model Publication No. Sho 55-39364.

Figure 1:
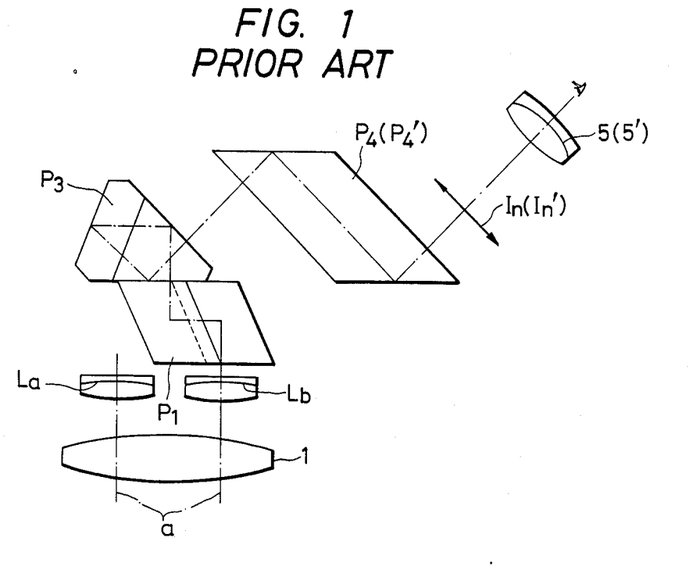
FIGS. 1 and 2 are schematic side elevation and a plan view, respectively, of an example of the optical system used in a conventional surgical microscope.
Figure 2:
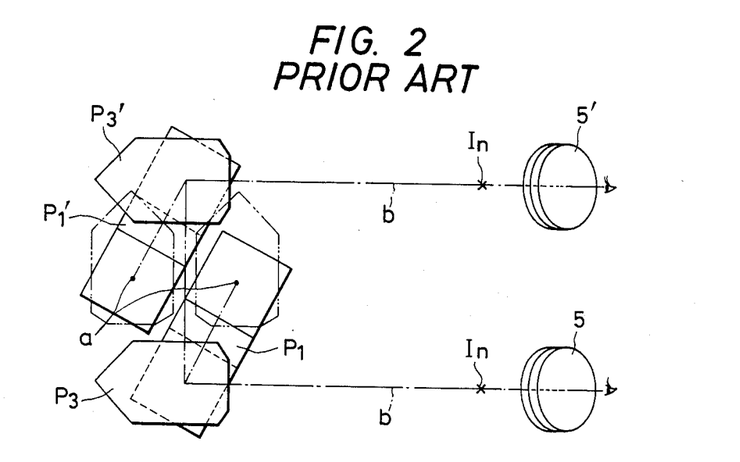

The device of the type (I) mentioned above is schematically shown in FIGS. 1 and 2. A specimen not shown for observation is located at a position on the downward extension of a pair of operator's bilateral observational optical axes "a". In connection with this, there is disposed on said optical axes "a" a set of members comprising a common objective lens 1, bilaterally arranged auxiliary lenses $L_a$ and $L_b$, and also light beam splitting prisms $P_1$ and $P_1'$. In the straightforward direction of transmission through these light beam splitting prisms $P_1$ and $P_1'$, there extend the operator's observational optical axes "a", and on their extensions, there is further disposed an observational optical system not shown. The operator surgeon (hereafter will be referred to merely as "operator") makes an observation by utilizing this observational optical system. On the other hand, in the directions in which the light beams are split and deflected by the light beam splitting prisms $P_1$ and $P_1'$, there extend a pair of assistant's observational optical axes "b" as shown by chain lines. On said optical axes "b" of the assistant, there is provided an assistant's observational optical system which comprises prisms $P_3$, $P_3'$, $P_4$, $P_4'$ and ocular lenses 5, 5'. Accordingly, by utilizing the operator's observational light beams which have been so split by the light beam splitting prisms $P_1$ and $P_1'$, the assistant is enabled to observe the same observational images $I_n$ and $I_n'$ as for the operator.

Figure 3A:
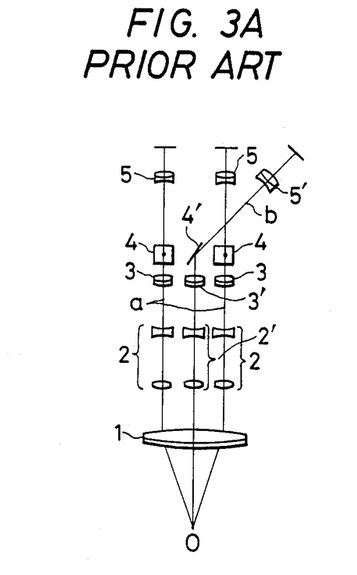
FIGS. 3A to 3C are illustrations showing another example of the conventional optical system, and the arrangement of the observational light bundles.
Figure 3B:
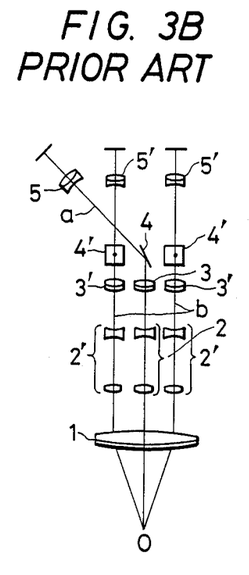
Figure 3C:
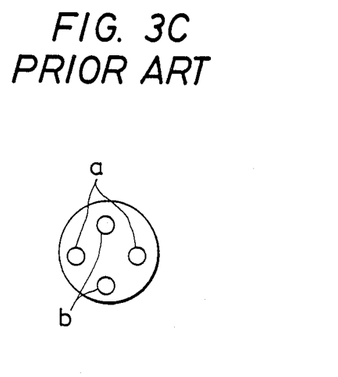
Figure 4A:
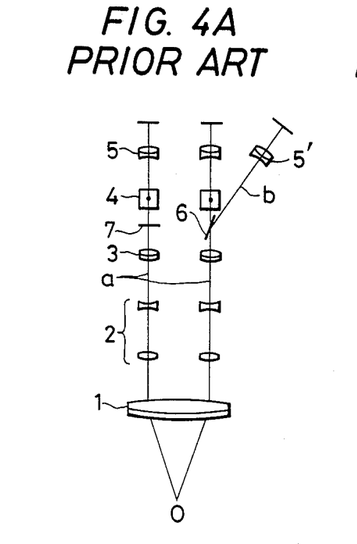
FIGS. 4A to 4C are illustrations showing still another example of the conventional optical system and the arrangement of the observational light bundles.
Figure 4B:
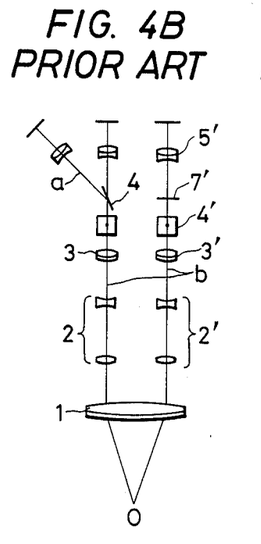
Figure 4C:
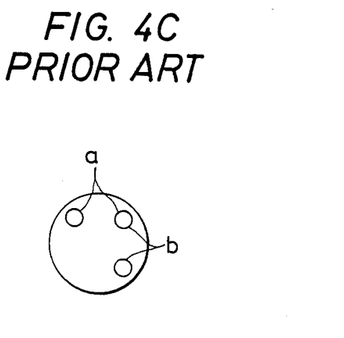

Also, the above-mentioned type (II) is of the arrangement as shown in FIGS. 3A to 3C that one pair of operator's observational optical axes "a" and one pair of assistant's observational optical axes "b" are accommodated independently of each other pair within a barrel, or as shown in FIGS. 4A to 4C, three optical axes using, in common, one of the bilateral view field optical paths are provided within a barrel, so that when the observation is conducted simultaneously by the operator and his assistant in directions crossing each other at right angles, both the operator and his assistant are able to obtain a stereoscopic image of the same region of the human body. It should be noted here that in these drawings, reference numerals 2, 2' represent zoom lenses; 3, 3' image focusing lenses; 4, 4' reflection mirrors, and 5, 5' ocular lenses.

However, with the above-mentioned type (I), there is the inconvenience that, while the operator is able to have his own normal stereoscopic view, the bilateral view field images afforded by the assistant's observational optical system are the bilateral view field images exactly as viewed at the operator's own position. These latter images for the assistant, therefore, differ from those bilateral view field images which would be viewed at that actual position of the assistant which is different by, for example, 90° from that of the operator, so that the assistant is unable to have a stereoscopic view in the normal way. For this reason, the assistant is placed in a difficulty in providing subtle and delicate assistance to the operator concerning the site requiring a surgical operation. Thus, there have been the problems that the risk of surgical operation is augmented and that the operation requires an extended period of time.

Also, in case of the above-mentioned type (II), while there arise no such problems as those occurring in the above-mentioned type (I), the number of optical axes which are to be accommodated in the barrel increases faster than in the case of an ordinary surgical microscope, so that the barrel per se tends to become large in size, impairing the operability of the device on the part of the operator and his assistant, and along therewith there arises the necessity for centering the four optical axes and also for adjusting the confocus of these optical axes, leading to the problem that the device becomes expensive as compared to the ordinary microscope comprising two optical axes.

SUMMARY OF THE INVENTION

It is, therefore, a primary object of the present invention to provide a surgical microscope which brings about safety in surgical operations and reduces the length of time of surgery, and which is manufactured at a cost substantially equal to that of the ordinary surgical microscope comprising two optical axes.

Another object of the present invention is to provide a surgical microscope which provides for an easy operability of the device in centering the respective optical axes and in adjusting the confocus of these respective optical axes.

Still another object of the present invention is to provide an arrangement that, only by mounting a required adapter onto an ordinary surgical microscope, both the operator and his assistant are enabled to make an observation of respective stereoscopic images.

A further object of the present invention is to provide a surgical microscope which enables both the operator and his assistant to observe respective very clear stereoscopic images.

These and other objects as well as the features and the advantages of the present invention will be apparent from the following detailed description of the preferred embodiments when taken in conjunction with the accompanying drawings.

DETAILED DESCRIPTION OF THE PREFERRED EMBODIMENTS

Figure 5:
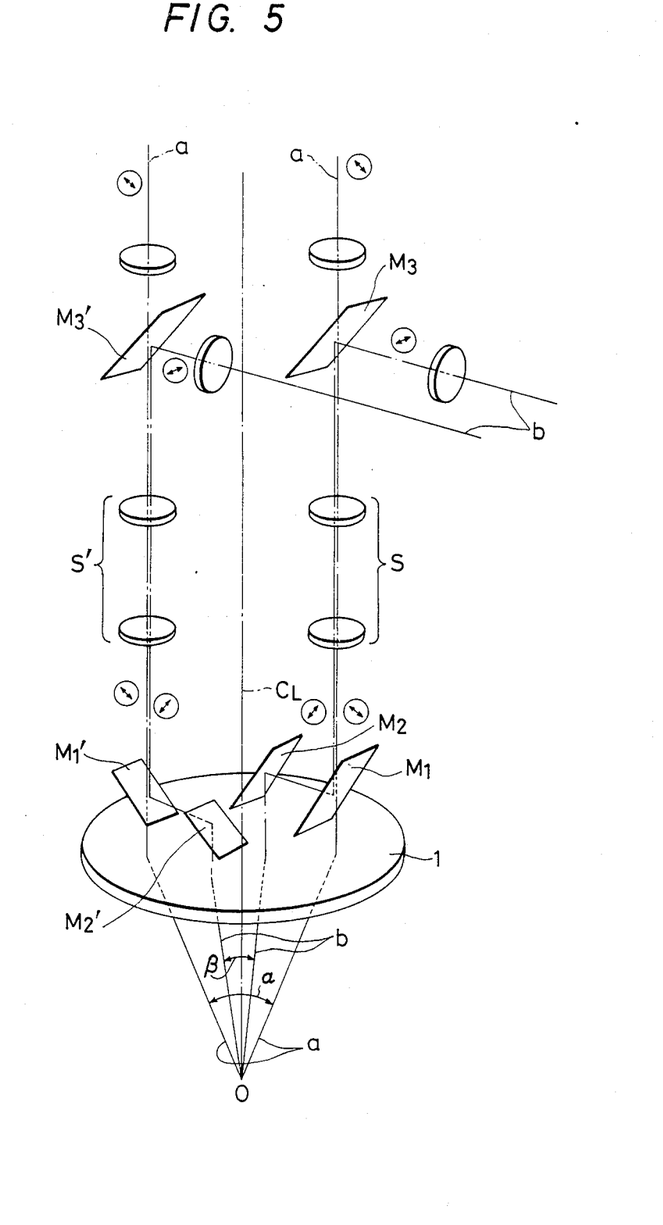
FIG. 5 is a structural illustration showing the structure, in principle, of the optical system employed in the surgical microscope according to the present invention.

Description will hereunder be made with respect to the general concept of the surgical microscope according to the present invention based on FIG. 5.

A surgical microscope (stereoscopic microscope) in general has an objective lens 1 and, provided rearwardly thereof, a pair of bilateral auxiliary optical systems S and S' which are mating and in agreement with the operator's bilateral observational optical axes "a", respectively. The auxiliary optical systems S and S' are each comprised of such members as relay lenses and/or zoom lenses. The operator is able to obtain an enlarged stereoscopic view of a specimen by acquiring bilateral view field images through a focusing optical system not shown which is provided rearwardly of the auxiliary optical systems S and S', respectively.

In order that the assistant who stands by the side of the operator may make a stereoscopic observation, in his own normal fashion, of that same region of the patient as for the operator, there is the necessity that the assistant's observational optical axes "b" which are substantially symmetrical in position relative to the central axis $C_L$ which passes through the center of the objective lens 1 and also which is parallel with the optical axes of the auxiliary optical systems S and S', i.e. the assistant's observational optical axes "b" having an angle of divergence $\beta$ and being located at such positions that the operator's observational axes "a" which incide with an angle of divergence $\alpha$ onto the objective lens 1 are turned by an angle of about 90°, and proceeding to the assistant's observational optical system not shown.

The surgical microscope according to the present invention comprising a pair of bilateral auxiliary optical systems S and S' for stereoscopic observation which are disposed rearwardly of a common objective lens 1 is of the arrangement: that a pair of first polarizing direction selecting and transmitting semi-transmissive mirrors $M_1$ and $M_1'$ are provided with an inclination relative to the optical axes "a", respectively, on the respective operator's observational optical axes "a" locating between the objective lens 1 and the pair of auxiliary optical systems S and S'; that, at positions rearwardly of the objective lens 1 and substantially symmetrical relative to an axis $C_L$ which passes through the central point of a segment of line connecting the optical axes of the pair of auxiliary optical systems S and S' and also which is parallel with the auxiliary optical systems S and S', there are provided a pair of total reflection mirrors $M_2$ and $M_2'$ with an inclination relative to the optical axes "b", respectively, in such a fashion that the light beams which have passed through the objective lens 1 are reflected at the pair of total reflection mirrors $M_2$ and $M_2'$ and which travel along the assistant's respective observational optical axes "b" incide onto the pair of first polarizing direction selecting and transmitting semi-transmissive mirrors $M_1$ and $M_1'$, respectively, in one-to-one relationship and reflect thereat so as to agree with the optical axes of the pair of auxiliary optical systems S and S'; and that, on the respective optical axes lying either inside or rearwardly of the pair of auxiliary optical systems S and S', there are provided, with an inclination relative to the optical axes "a" ("b"), a pair of second polarizing direction selecting and transmitting semi-transmissive mirrors $M_3$ and $M_3'$ having their polarizing selecting directions agreeing with those of the pair of first polarizing direction selecting and transmitting semi-transmissive mirrors $M_1$ and $M_1'$, respectively, whereby the assistant is able to observe the bilateral view field images as viewed at his own position so that he is able to have a stereoscopic view in his own normal fashion, and that, in addition thereto, the number of the optical axes which are accommodated within the barrel is reduced to two as in the prior art such devices.

More particularly, the light beams which pass through the objective lens 1 and incide directly onto the first polarizing direction selecting and transmitting semi-transmissive mirrors $M_1$ and $M_1'$ provided on the optical axes of the auxiliary optical systems S and S' and also which advance along the operator's observational optical axes "a", are so selected that only those beams whose direction of vibration agree with the direction of polarization selected by said semi-transmissive mirrors $M_1$ and $M_1'$ are allowed to pass therethrough and incide onto the auxiliary optical systems S and S'. On the other hand, the light beams advancing along the assistant's observational optical axes "b" are reflected at the total reflection mirrors $M_2$ and $M_2'$ and incide onto the semi-transmissive mirrors $M_1$ and $M_1'$, respectively, and only those light beams having vibration components not agreeing with the direction of polarization selected by the semi-transmissive mirrors $M_1$ and $M_1'$ are reflected. Here, the light beams coming from the assistant's observational optical axes "b" and reflected at the semi-transmissive mirrors $M_1$ and $M_1'$ coincide with the operator's observational optical axes "a". As a result, the assistant's obsevational light beams also incide onto the auxiliary optical systems S and S', respectively. Whereby, the direction of vibration of the operator's observational ligth beams which travel along the operator's observational optical axes "a" and incide onto the auxiliary optical systems S and S' differs from the direction of vibration of the assistant's observational light beams which advance along the assistant's observational optical axes "b" and incide onto the auxiliary optical systems S and S'. The operator's observational light beams which incide onto the auxiliary optical systems S and S' and which further incide onto the polarizing direction selecting and transmitting semi-transmissive mirrors $M_3$ and $M_3'$, respectively, are such that their directions of vibration agree with the direction of polarization selected by the semi-transmissive mirrors $M_3$ and $M_3'$, so that the operator's observational light beams transmit through these semi-transmissive mirrors $M_3$ and $M_3'$, respectively. On the other hand, the assistant's observational light beams which incide onto the semi-transmissive mirrors $M_3$ and $M_3'$ are such that their directions of vibration differ from the direction of polarization selected by the semi-transmissive mirrors $M_3$ and $M_3'$, so that these light beams are reflected thereby. As a result, the operator's observational light beams are separated from the observational light beams for the assistant. Accordingly, by providing a focusing optical system (not shown) on the operator's observational optical axes "a" at a position locating rearwardly of the semi-transmissive mirrors $M_3$ and $M_3'$, the operator is able to make a normal fashion observation of a stereoscopic image as viewed as his own position. Likewise, by the provision of a focusing optical system (not shown) on the assistant's observational optical axes "b" which are separated by the semi-transmissive mirrors $M_3$ and $M_3'$, the assistant also is able to make an observation of the stereoscopic image in normal fashion as viewed at the assistant's own position. Also, as stated above, the number of the optical axes to be accommodated within the barrel is made to be two as in the conventional such devices.

It should be noted here that the arrows given in FIG. 5 indicate the directions of vibration of the light beams.

Hereunder, the present invention will be described in detail based on a first embodiment shown in FIGS. 6A to 8, by assigning like reference numerals and symbols to like parts of the above-stated conventional examples.

Figure 6A:
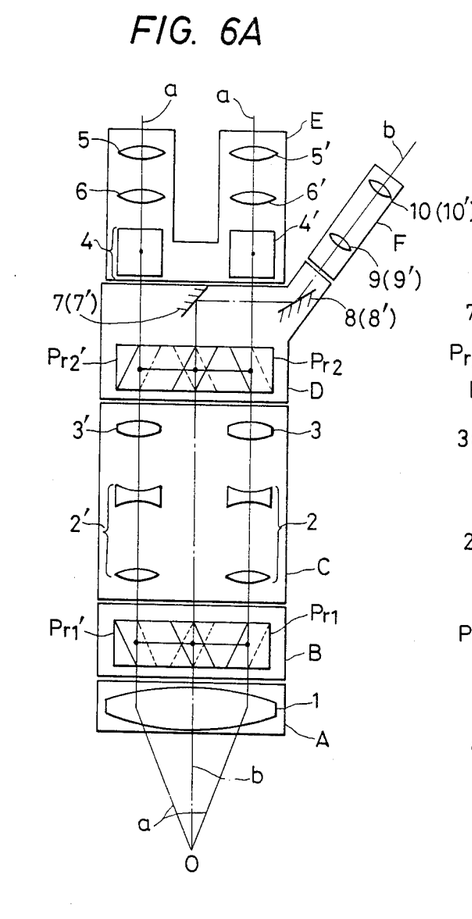
FIGS. 6A and 6B are a schematic front view and a side elevation, respectively, showing the optical system of an embodiment of the surgical microscope according to the present invention.
Figure 6B:
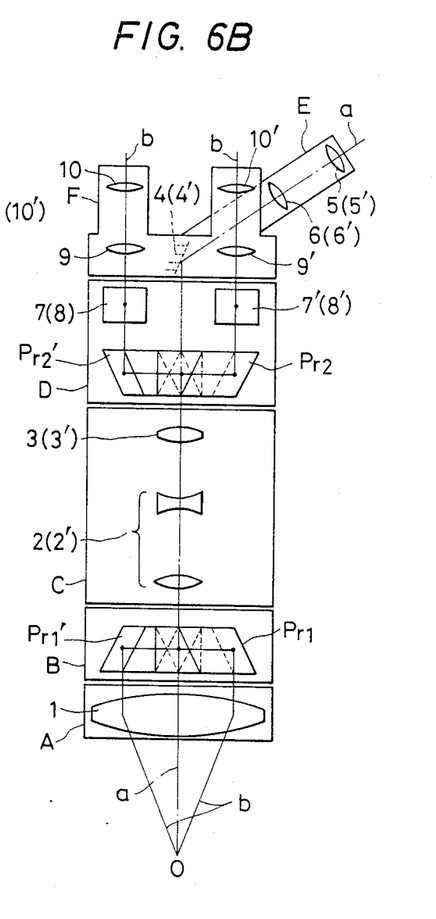

In FIGS. 6A and 6B, an objective lens unit A having an objective lens 1 is provided to face a specimen O. Rearwardly thereof, there are provdied a stereoscopic view adapter B, a barrel C and a stereoscopic view adapter D to lie along the optical axes, respectively. Furthermore, along the operator's observational optical axes "a" which are so separated by the stereoscopic view adapter D, there is provided an operator's focusing optical system E, and along the assistant's observational optical axes "b", there is provided an assistant's focusing optical system F. Within the barrel C, there are a pair of bilateral view field optical axes. On these respective optical axes, there are provided zoom lenses 2, 2' and relay lenses 3, 3'. In the operator's focusing optical system E, there are provided mirrors 4, 4' for deflecting the optical axes onto the operator's pair of bilateral observational optical axes "a", focusing lenses 6, 6' and ocular lenses 5, 5' on a pair of operator's bilateral observational optical axes "a", respectively. The objective lens unit A, the stereoscopic view adapter B, the barrel C, the stereoscopic view adapter D and the operator's focusing optical system E are coupled to each other in such a way that their optical axes coincide with each other by known coupling means such as dovetail 11 and dovetail grooves 12 as shown schematically in FIG. 7. The state in which only the objective lens unit A, the barrel C and the operator's focusing optical system E are coupled together will provide for the arrangement of the generally well-known surgical microscope. As the above-mentioned coupling means, there may be employed screws and the like.

Figure 8:
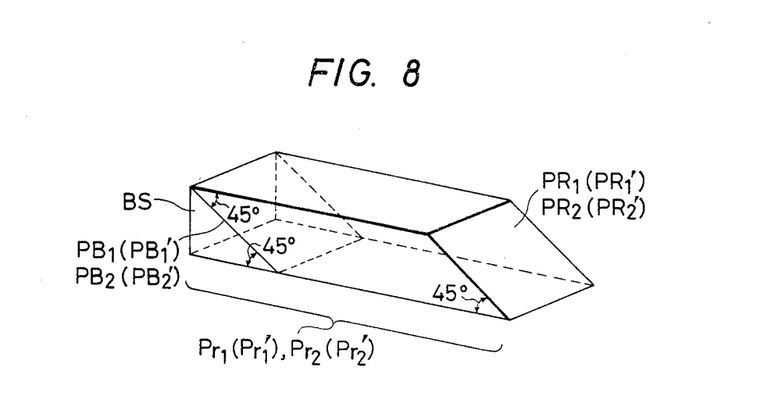
FIG. 8 is a perspective view of a prism employed in the above-mentioned embodiment.
Figure 9:
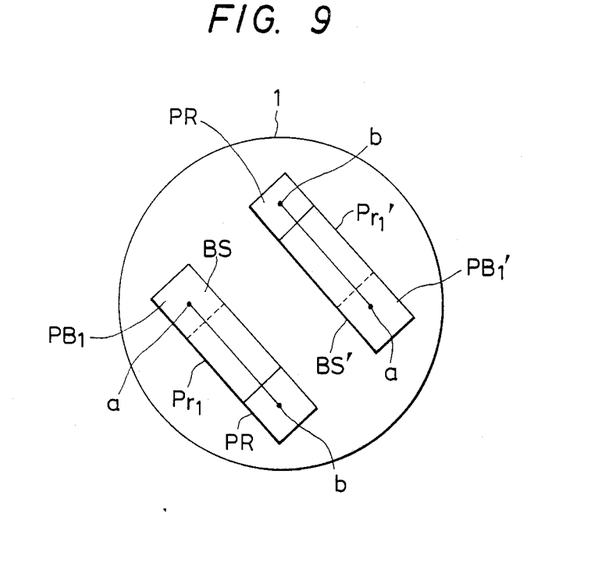
FIG. 9 is a plan view of an adapter for stereoscopic viewing which is employed in the above-mentioned embodiment.
Figure 10A:
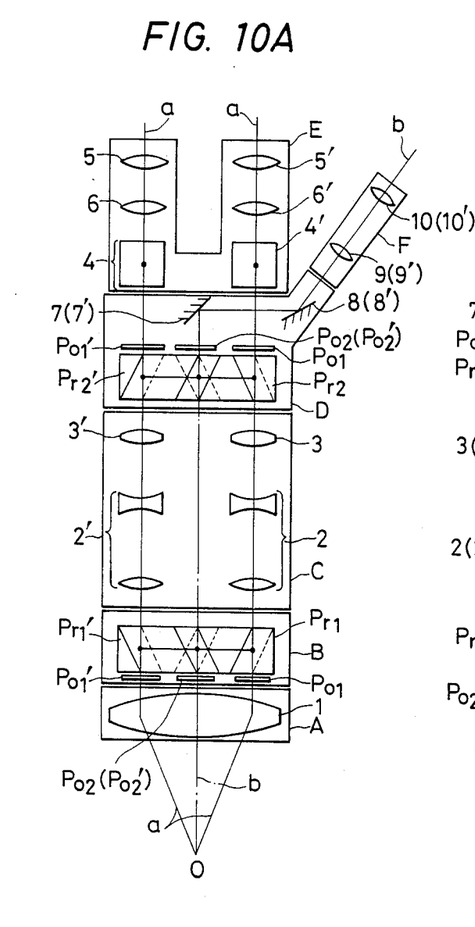
FIGS. 10A and 10B are a schematic front view and a side elevation showing the optical system of another embodiment of the surgical microscope according to the present invention.
Figure 10B:
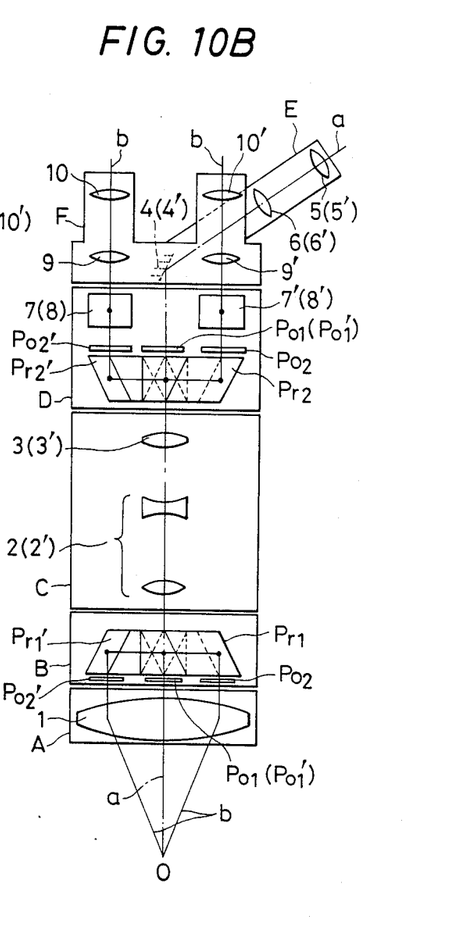
Figure 11:
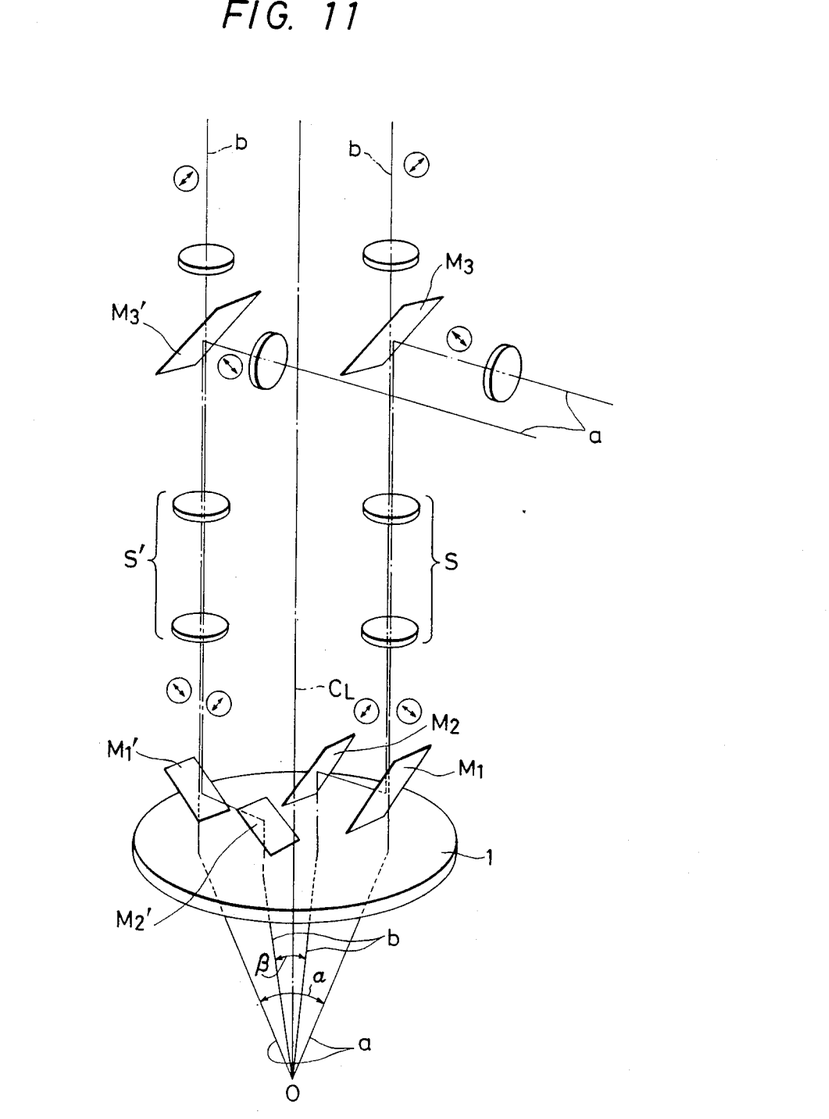
FIG. 11 is an illustration of the structure showing the principle of the optical system, somewhat differing from FIG. 5, which is employed in the surgical microscope according to the present invention.

Within the stereoscopic view adaper B, two prisms $Pr_1$ and $Pr_1'$ each having a polarized beam splitter section BS (BS') and a total reflection surface $PR_1$ ($PR_1'$) parallel with a polarizing film $PB_1$ ($PB_1'$) of the polarized beam splitter section BS (BS') as shown in FIG. 8 are disposed in such a manner that the polarized beam splitter sections BS and BS' of the prisms $Pr_1$ and $Pr_1'$ are positioned on a pair of operator's observational optical axes "a", respectively, and that the rectilinear line connecting the polarizing film $PB_1$ ($PB_1'$) to the total reflection surface $PR_1$ ($PR_1'$) forms an angle of about 45° relative to the rectilinear line connecting between a pair of operator's observational optical axes "a", and also that the total reflection surfaces $PR_1$ and $PR_1'$ are positioned symmetrical relative to the central axis of the objective lens 1, as shown in FIG. 9. Whereby, there are formed a pair of assistant's observational optical axes "b" which pass, respectively, through the specimen O, the objective lens 1, the total reflection surfaces $PR_1$, $PR_1'$ and the polarizing films $PB_1$, $PB_1'$, respectively. On the other hand, within the stereoscopic view adapter D, there are disposed prisms $Pr_2$ and $Pr_2'$ having the same shape and structure as those prisms $Pr_1$ and $Pr_1'$, respectively, which are shown in FIG. 8, so as to assume such orientations that the beam splitter sections of the prisms $Pr_2$ and $Pr_2'$ are positioned on a pair of operator's observational optical axes "a", respectively, and that the extension surfaces of the polarizing films $PB_2$ and $PB_2'$ of the prisms $Pr_2$ and $Pr_2'$ and the extension surfaces of the polarizing films $PB_1$ and $PB_1'$ of the prisms $Pr_1$ and $Pr_1'$ cross each other at right angles, respectively. Furthermore, on the assistant's observational by the total reflection surfaces $PR_2$ and $PR_2'$ of the prisms $Pr_2$ and $Pr_2'$, there are provided mirrors 7 and 7', and 8, 8', respectively, to serve as the deflectors. Moreover, within the assistant's focusing optical system F which is located on the extensions of the assistant's observational optical axes "b", there are provided, respectively, focusing lenses 9 and 9' for focusing the assistant's observational light beams which emit from the stereoscopic view adapter D, and also are provided ocular lenses 10 and 10' for allowing the assistant to observe the images.

The surgical microscope according to the present invention is structured as described above. In case the assistant is to have a stereoscopic view of the same region of the patient which is viewed by the operator, it is only necessary to decouple the connection of the objective lens unit A, the barrel C and the operator's focusing optical system E and to insert the stereoscopic view adapter B between the objective lens unit A and the barrel C, and to insert the stereoscopic view adapter D between the barrel C and the operator's focusing optical system E and to couple them together, and further to connect the assistant's focusing optical system F to the assistant's observational light beam emitting end of the stereoscopic view adapter D.

Description will hereunder be made first of the instance wherein the operator conducts an observation. The light beams emitting from the specimen O advance along the operator's observational optical axes "a", and pass through the objective lens 1 and impinge onto the prisms $Pr_1$ and $Pr_1'$, respectively. When these light beam coincide onto the polarizing films $PB_1$ and $PB_1'$ of the prisms $Pr_1$ and $Pr_1'$, only the component of the P-polarized light, in general, among those components of the incident light are allowed to transmit therethrough, and the resulting light beams incide onto the zoom lenses 2 and 2', respectively. The light beams are here subjected to a varied magnification, and they are relayed by the relay lenses 3 and 3' and incide onto the polarizing films $PB_2$ and $PB_2'$ of the prisms $Pr_2$ and $Pr_2'$, respectively. Since the operator's observational light beams are thus constituted only by the component of the P-polarized light alone, the entire beams transmit through the polarizing films $PB_2$ and $PB_2'$, respectively, and incide onto the operator's focusing optical system E. When the operator observes the images focused by the focusing lenses 6 and 6' via the ocular lenses 5 and 5', there can be attained an observation of a stereoscopic image.

Description will next be made of the instance wherein the assistant conducts an observation. The light beams emitting from the specimen O pass through the objective lens 1 and incide onto the total reflection surfaces $PR_1$ and $PR_1'$ of the prisms $Pr_1$ and $Pr_1'$ and are deflected, respectively, and incide onto the polarizing films $PB_1$ and $PB_1'$. Here, only the component of the S-polarized light among those components of the assistant's observational light beams is reflected, and the resulting light beams incide onto the zoom lenses 2 and 2' to be subjected to a varied magnification thereby, and the resulting light beams are further relayed by the relay lenses 3 and 3', and thereafter the beams incide onto the polarizing films $PB_2$ and $PB_2'$ of the prisms $Pr_2$ and $Pr_2'$, respectively. Since the assistant's observational light beams are constituted only by the S-polarized component alone, these light beams are reflected entirely by the polarizing films $PB_2$ snd $PB_2'$, and further they are polarized by the total reflection surfaces $PR_2$ and $PR_2'$ of the prisms $Pr_2$ and $Pr_2'$, and the resulting light beams are reflected by the mirrors 7, 7' and 8, 8', and thereafter the beams impinge onto the assistant's focusing optical system F. In a manner similar to that for the above-described instance of the operator, when the assistant views the images through the ocular lenses 10 and 10', an observation of a stereoscopic image can be obtained.

As has been described above, according to the surgical microscope of the present invention, the assistant also is made to make an observation, in normal fashion, of a stereoscopic image viewed at his own position (e.g. which may be an angular position of 90° relative to the operator's position). Thus, the assistant is rendered feasible to offer his timely and proper assistance with respect to the site of surgical operation, thus enhancing the safety in the surgical operation, and what is more, the time length required for surgery is shortened. Also, the surgical microscope of the present invention is such that the number of the optical axes which are accommodated within a barrel is reduced to two, as in such conventional microscopes as stated above, so that the size of the barrel per se can be of about the same size as in the case of the ordinary two-optical-axes type, and furthermore the operability of the device by the assistant is not impaired and, along therewith, the centering of the optical axes and the adjustment of the confocus of the optical axes can be accomplished easily, and the price of the microscope can be set at a level which is about the same as those of the ordinary surgical microscopes. Also, by the provision of the assistant's stereoscopic view optical system in the form of an adapter, it should be noted that, only by attaching this adapter to an ordinary surgical microscope, both the operator and his assistant are enabled to make a stereoscopic observation, respectively. For this reason, the need to additionally purchase a barrel having an optical system for enabling the assistant to make a stereoscopic view is eliminated. Therefore, there is another advantage that, only by adding a simplified and inexpensive adapter to the barrel which the operator has been accustomed to use, the surgical microscope can be modified into one which allows his assistant also to obtain a stereoscopic view.

As another embodiment of the present invention, there is provided an arrangement that, in the foreground of the prisms $Pr_1$ and $Pr_1'$ and also in the rear ground of the prisms $Pr_2$ and $Pr_2'$, which are all located on the operator's observational optical axes "a" in the above-described embodiment, there are provided such polarizing plates as will transmit therethrough the polarized light beams having the same direction of vibration as those of the light beams transmitted through the polarizing films $PB_1$, $PB_1'$, $PB_2$, $PB_2'$, and that, along therewith, in the foreground of the prisms $Pr_1$ and $Pr_1'$ and on the rearground of the prisms $Pr_2$ and $Pr_2'$ which all lie on the assistant's observational optical axes "b", there are disposed such polarizing plates as will transmit therethrough those polarized light beams having the same direction of vibration as those of the reflection light beams coming from the polarizing films $PB_1$, $PB_1'$, $PB_2$, $PB_2'$.

According to this second embodiment, the operator's observational light beams are reduced to only the component of the perfect P-polarized light before inciding onto the prisms $Pr_1$ and $Pr_1'$, and on the other hand the assistant's observational light beams also are rendered to only the component of the perfect S-polarized light before inciding onto the prisms $Pr_1$ and $Pr_1'$. Also, those light beams which incide onto the eyes of the operator are limited to only the P-polarized light, and the light beams inciding onto the eyes of the assistant also are limited to only the S-polarized light. That is, the ratio of extinction of light between the two is greatly improved.

As such, in the above-described first embodiment, it should be noted that, in case the precision in the manufacture of the polarizing films of the prisms $Pr_1$, $Pr_1'$ and the prisms $Pr_2$, $Pr_2'$ is poor, the separation between the P-polarization and the S-polarization cannot be achieved perfectly, so that, as a result, the resulting image which is viewed by the operator is one which is superposed by the assistant's observational image, and likewise the observational image on the assistant's side is one superposed by the operator's observational image. In this second embodiment, however, such a drawback as mentioned just above can be perfectly eliminated.

In the above-described respective embodiments, arrangement is provided invariably that the semi-transmissive mirrors $M_1$ and $M_3$, and $M_1'$ and $M_3'$ have their polarization selecting orientations which are in agreement with each other, so that the operator's observational light beams transmit through the semi-transmissive mirrors $M_3$, $M_3'$ and advance straightforwardly, and that the assistant's observational light beams are reflected at the semi-transmissive mirrors $M_3$, $M_3'$ and advance in directions different from those of the operator's observational light beams. It should be noted here that it is possible to modify the arrangement in such a way that the polarization selecting orientations of the semi-transmissive mirrors $M_1$ and $M_3$ are shifted for an angle of 90° relative to each other, and that the polarization selecting orientations of the semi-transmissive mirrors $M_1'$ and $M_3'$ are shifted for an angle of 90° relative to each other so that the assistant's observational light beams transmit through the semi-transmissive mirrors $M_3$, $M_3'$ and advance straightforwardly, whereas the operator's observational light beams are reflected at the semi-transmissive mirrors $M_3$, $M_3'$ to advance in directions different from the directions of advancement of the assistant's observational light beams.

Figure 7:
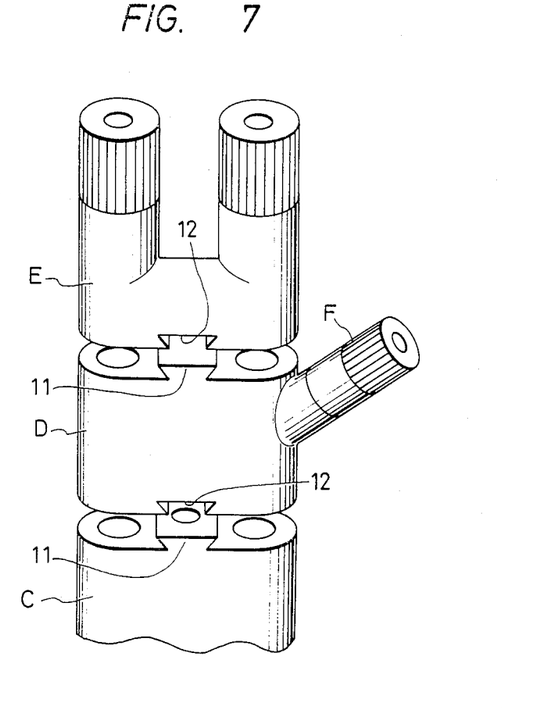
FIG. 7 is a somewhat exploded partial perspective view showing an example of the coupling structure between respective adapters.
Figure 12:
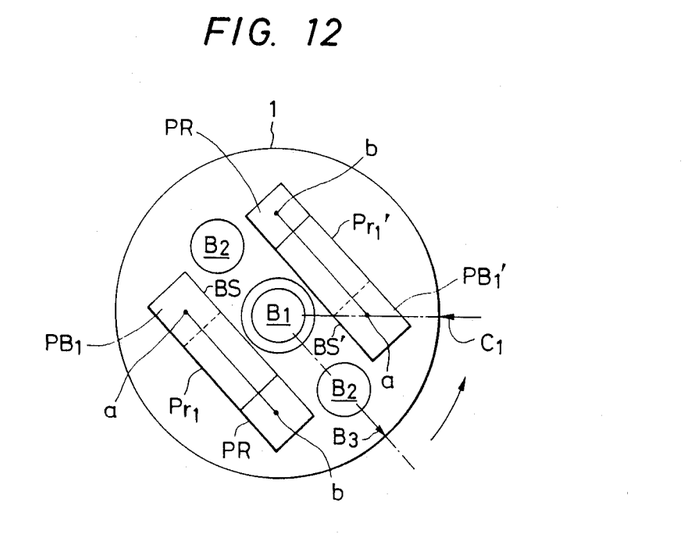
FIG. 12 is a plan view showing an embodiment of the stereoscopic view adapter which differs from FIG. 9.

Furthermore, in the above-mentioned embodiments, arrangement is provided, as shown clearly in FIG. 7, so that, for example, rectilinear dovetail coupling is employed to couple the stereoscopic view adapters B and D to the objective lens unit A, the barrel C and the operator's focusing optical system E, respectively, whereby allowing arbitrarily the selection between an observation conducted only by the operator and a simultaneous observation conducted by both the operator and his assistant. This selection, however, can be accomplished also by such an arrangement as schematically shown in FIG. 12. That is, according to this instant embodiment, the stereoscopic view adapter B is mounted for rotation about the central axis $C_L$ relative to the objective lens unit A and to the barrel C by means of a known round dovetail coupling $B_1$ and has a pair of openings $B_2$ and $B_2$ which can be brought into alignment with the pair of auxiliary optical systems S and S', respectively. The illustrated state shows the setting position which enables a simultaneous observation by both the operator and his assistant. By rotating the adapter B for an angle of 45° in the direction of the arrow from the above-stated position to bring the marking $B_3$ which is formed on the surface of the adapter B into agreement with the fixed marking $C_1$ which is provided on the barrel C, the polarized beam splitter sections BS and BS' and the total reflection surfaces PR and PR' of the prisms $Pr_1$ and $Pr_1'$ will be caused to move to the outside of the optical paths, and in their place the openings $B_2$ and $B_2$ will be brought into coincidence with the optical paths containing only the optical axes "a" and "a". In this case, the stereoscopic view adapter D also is structured in the similar fashion as that of the stereoscopic view adapter B, and the former can be turned likewise for an angle of 45°. Thus, the surgical microscope of the present invention is set to a state allowing the observation to be conducted only by the operator. According to this instant embodiment, by the provision of an appropriate click means or like means between the barrel C and the stereoscopic view adapters B and D, the changeover operation between the observation conducted only by the operator and the simultaneous observation conducted by both the operator and his assistant can be smoothly and unfailingly realized. In such a case, by coupling the stereoscopic view adapter B to the barrel C by an appropriate coupling means, it is possible to further enhance the operability of the device.

What is claimed is:

1. A surgical microscope, comprising:
   a common objective lens;
   a pair of auxiliary optical systems for stereoscopic view observation, disposed, on the image side of said common objective lens, on a pair of operator's observational optical axes, respectively;
   a pair of first polarizing direction selecting and transmitting semi-transmissive mirrors disposed, with an inclination relative to said operator's observational optical axes, respectively, on those portions, respectively, of said pair of operator's observational optical axes which are located between respective said pair of auxiliary optical systems and said common objective lens;
   a pair of total reflection mirrors disposed at positions substantially symmetrical relative to an axial line which passes through the center of a segment of line connecting between said pair of operator's observational optical axes and which is parallel with said pair of operator's observational optical axes, for causing the light beams having been transmitted through said common objective lens along a pair of assistant's observational optical axes to be totally reflected, respectively, in such a way that the transmitted light beams incide onto said pair of first polarizing direction selecting and transmitting semi-transmissive mirrors, respectively, and are reflected thereat to advance toward said pair of auxiliary optical systems, respectively; and
   a pair of second polarizing direction selecting and transmitting semi-transmissive mirrors disposed, with an inclination relative to said operator's observational optical axes, respectively, on said operator's observational optical axes, respectively, at locations lying either within said pair of auxiliary optical systems or on the image side thereof, respectively, and having polarizing directions either agreeing with those of said pair of first polarizing direction selecting and transmitting semi-transmissive mirrors, respectively, or crossing those of said mirrors at right angles, respectively.

2. A surgical microscope according to claim 1, in which:
   said common objective lens is constructed as an objective lens unit,
   said pair of first polarizing direction selecting and transmitting semi-transmissive mirrors and said pair of total reflection mirrors are constructed as a first stereoscopic view adapter,
   said pair of auxiliary optical systems is constructed in the form of a barrel,
   said pair of second polarizing direction selecting and transmitting semi-transmissive mirrors is constructed as a second stereoscopic view adapter, and
   said objective lens unit, said first stereoscopic view adapter, said barrel and said second stereoscopic view adapter are removably coupled to each other.

3. A surgical microscope according to claim 2, in which:
   said second stereoscopic view adapter is provided with a pair of assistant's focusing optical systems.

4. A surgical microscope according to claim 2 or 3, further comprising:
   a pair of operator's focusing optical systems removably coupled to said second stereoscopic view adapter.

5. A surgical microscope according to claim 2, further comprising:
   a pair of operator's focusing optical systems removably coupled to said second stereoscopic view adapter and provided with a pair of assistant's focusing optical systems, respectively.

6. A surgical microscope according to claim 1, in which:
   said pair of first polarizing direction selecting and transmitting semi-transmissive mirrors and said pair of total reflection mirrors are constructed to form an integral first prism unit comprising a pair of prisms each having a polarized light beam splitter section provided with a polarizing film and with a total reflection surface parallel with said polarizing film,
   said polarized light beam splitter sections in said prisms are positioned to lie on said pair of operator's observational optical axes, respectively,
   said prisms of the first prism unit are arranged so that the segment of line connecting the center of the polarizing film to the center of the total reflection surface in each of said prisms forms an angle of substantially 45° relative to the segment of line connecting between said pair of operator's observational optical axes in said prisms, and that the total reflection surfaces of said prisms are positioned to lie symmetrical relative to the central axial line of said common objective lens, said pair of second polarizing direction selecting and transmitting semi-transmissive mirrors are constructed as a second prism unit comprising a pair of prisms each having a polarized beam splitter section provided with a polarizing film and a total reflection surface parallel with said polarizing film, and the polarized beam splitter sections of said second prism unit are disposed to lie on said pair of operator's observational optical axes, respectively.

7. A surgical microscope according to claim 6, further comprising:

a pair of first polarizing plates provided on the light incidence side, respectively, of said polarizing films of said prisms constituting said first prism unit to cover the light-incidence areas corresponding to said polarizing films of said prisms and to allow the transmission therethrough of the polarized light beams having the same direction of vibration as that of the light beams having transmitted through said polarizing films;

a pair of second polarizing plates provided on the light emission side, respectively, of the polarizing films of the prisms constituting said second prism unit to cover the light-emission areas corresponding to the polarizing films of said prisms of the second prism unit and to allow the transmission therethrough of the polarized light beams having the same direction of vibration as that of the light beams having transmitted through said polarizing films;

a pair of third polarizing plates provided on that side of light which is incident to the total reflection surfaces, respectively, of said first prism unit to cover the light-incidence areas corresponding to said total reflection surfaces and to allow the transmission therethrough of the polarized light beams having the same direction of vibration as that of the light beams reflected by said polarizing films; and a pair of fourth polarizing plates provided on the light emission side of the total reflection surfaces of the prisms, respectively, of said second prism unit to cover the light-emission surfaces corresponding to said reflection surfaces and to allow the transmission therethrough of the polarized light beams having the same direction of vibration as that of the light beams reflected by said polarizing films.

8. A surgical microscope according to claim 7, in which:

said common objective lens is constructed as an objective lens unit, said prisms of the first prism unit and said first and third polarizing plates are constructed as a first stereoscopic view adapter, said pair of auxiliary optical systems are constructed in the form of a barrel, said prisms of the second prism unit and said pairs of second and fourth polarizing plates are constructed as a second stereoscopic view adapter, said pair of auxiliary optical systems are constructed in the form of a barrel, said prisms of the second prism unit and said pairs of second and fourth polarizing plates are constructed as a second stereoscopic view adapter, and said objective lens unit, said first stereoscopic view adapter, said barrel and said second stereoscopic view adapter are removably coupled to each other.

9. A surgical microscope according to claim 8, in which:

said second stereoscopic view adapter is provided with a pair of assistant's focusing optical systems.

10. A surgical microscope according to claim 8 or 9, further comprising:

an operator's focusing optical system removably coupled to said second stereoscopic view adapter.

11. A surgical microscope according to claim 8, further comprising:

an operator's focusing optical system provided with a pair of assistant's focusing optical systems.

12. A surgical microscope according to claim 1, in which:

said common objective lens is constructed as an objective lens unit;

said pair of first polarizing direction selecting and transmitting semi-transmissive mirrors and said total reflection mirrors are constructed as a first stereoscopic view adapter;

said first stereoscopic view adapter is provided with a pair of openings capable of being aligned with said pair of auxiliary optical systems, respectively;

said first and second stereoscopic view adapters are concentrically rotatably coupled, respectively, to said barrel, whereby, when said first and second stereoscopic view adapters are rotated for a predetermined amount of angle, only said pair of openings are brought into alignment with said pair of auxiliary optical systems, respectively, to allow an observation conducted only by the operator.

13. A surgical microscope according to claim 12, in which:

said second stereoscopic view adapter is provided with a pair of assistant's focusing optical systems.

14. A surgical microscope according to claim 12 or 13, further comprising:

a pair of operator's focusing optical systems removably coupled to said second stereoscopic view adapter.

15. A surgical microscope according to claim 12, further comprising:

a pair of operator's focusing optical systems removably coupled to said second stereoscopic view adapter and provided with a pair of assistant's focusing optical systems, respectively.

* * * * *